United States Patent
Lee et al.

(10) Patent No.: US 11,063,304 B2
(45) Date of Patent: Jul. 13, 2021

(54) SECONDARY BATTERY HAVING SYMMETRIC MULTI-TABS

(71) Applicant: Samsung SDI Co., Ltd., Yongin-si (KR)

(72) Inventors: Dong Hyun Lee, Yongin-si (KR); Hyung Sik Kim, Yongin-si (KR); Kwang Soo Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 46 days.

(21) Appl. No.: 16/485,410

(22) PCT Filed: Feb. 8, 2018

(86) PCT No.: PCT/KR2018/001684
§ 371 (c)(1),
(2) Date: Aug. 12, 2019

(87) PCT Pub. No.: WO2018/155853
PCT Pub. Date: Aug. 30, 2018

(65) Prior Publication Data
US 2019/0363401 A1    Nov. 28, 2019

(30) Foreign Application Priority Data
Feb. 22, 2017 (KR) .................. 10-2017-0023770

(51) Int. Cl.
*H01M 10/0587* (2010.01)
*H01M 50/10* (2021.01)
(Continued)

(52) U.S. Cl.
CPC ....... *H01M 10/0587* (2013.01); *H01M 50/10* (2021.01); *H01M 50/172* (2021.01);
(Continued)

(58) Field of Classification Search
CPC .. H01M 10/0587; H01M 2/0237; H01M 2/06; H01M 2/263; H01M 2/305;
(Continued)

(56) References Cited

U.S. PATENT DOCUMENTS

| 10,050,253 B2 | 8/2018 | Guen |
| 2001/0008725 A1 | 7/2001 | Howard |

(Continued)

FOREIGN PATENT DOCUMENTS

| EP | 3128572 A1 | 2/2017 |
| JP | 8-227722 A | 9/1996 |

(Continued)

OTHER PUBLICATIONS

EPO Extended European Search Report dated Oct. 30, 2020, issued in corresponding European Patent Application No. 18757592.3 (9 pages).

*Primary Examiner* — Olatunji A Godo
(74) *Attorney, Agent, or Firm* — Lewis Roca Rothgerber Christie LLP

(57) ABSTRACT

Embodiments of the invention relate to a secondary battery having symmetric multi-tabs, and the technical problem to be solved is providing a secondary battery capable of increasing the insulation level of first and second multi-tabs by forming the first and second multi-tabs of first and second electrode assemblies to be symmetric to each other. To this end, the present invention provides a secondary battery comprising: a case; a first electrode assembly accommodated inside the case and having first multi-tabs; a second electrode assembly accommodated in parallel with the first electrode assembly inside the case and having second multi-tabs; and a cap plate closing the case and having electrode terminals electrically connected to the first and second multi-tabs of the first and second electrode assemblies, wherein the first and second multi-tabs are formed so as to (Continued)

be symmetrical with respect to the boundary area between the first and second electrode assemblies.

10 Claims, 10 Drawing Sheets

(51) Int. Cl.
   *H01M 50/172* (2021.01)
   *H01M 50/538* (2021.01)
   *H01M 50/543* (2021.01)
   *H01M 50/572* (2021.01)

(52) U.S. Cl.
   CPC ....... *H01M 50/538* (2021.01); *H01M 50/543* (2021.01); *H01M 50/572* (2021.01)

(58) Field of Classification Search
   CPC .... H01M 2/34; H01M 50/538; H01M 50/543; H01M 50/572
   See application file for complete search history.

(56) References Cited

U.S. PATENT DOCUMENTS

| | | |
|---|---|---|
| 2003/0035748 A1 | 2/2003 | Trinh et al. |
| 2004/0127463 A1 | 7/2004 | Trinh et al. |
| 2011/0104539 A1 | 5/2011 | Oh et al. |
| 2014/0120397 A1* | 5/2014 | Kim ........................ H01M 2/26 429/94 |
| 2016/0049635 A1 | 2/2016 | Park et al. |
| 2016/0099444 A1 | 4/2016 | Park et al. |
| 2016/0099445 A1 | 4/2016 | Park et al. |
| 2016/0336574 A1 | 11/2016 | Guen et al. |
| 2016/0351954 A1* | 12/2016 | Lee ..................... H01M 10/058 |
| 2017/0018759 A1 | 1/2017 | Guen |

FOREIGN PATENT DOCUMENTS

| | | |
|---|---|---|
| KR | 10-2004-0092533 A | 11/2004 |
| KR | 10-2009-0085966 A | 8/2009 |
| KR | 10-2015-0144599 A | 12/2015 |
| KR | 10-2016-0042244 A | 4/2016 |
| KR | 10-2016-0113841 A | 10/2016 |
| KR | 10-2016-0134236 A | 11/2016 |
| KR | 10-2017-0009065 A | 1/2017 |

* cited by examiner

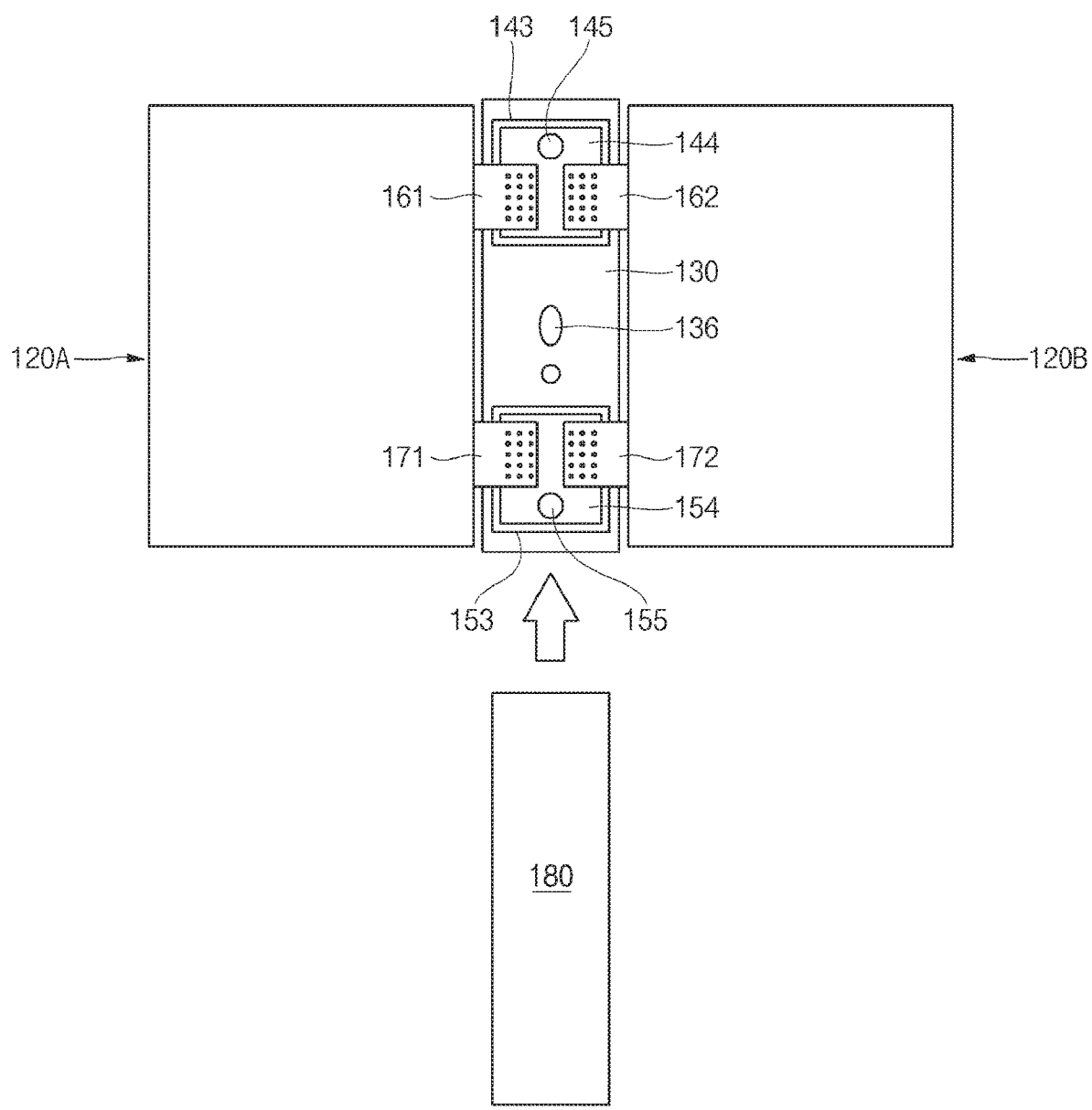

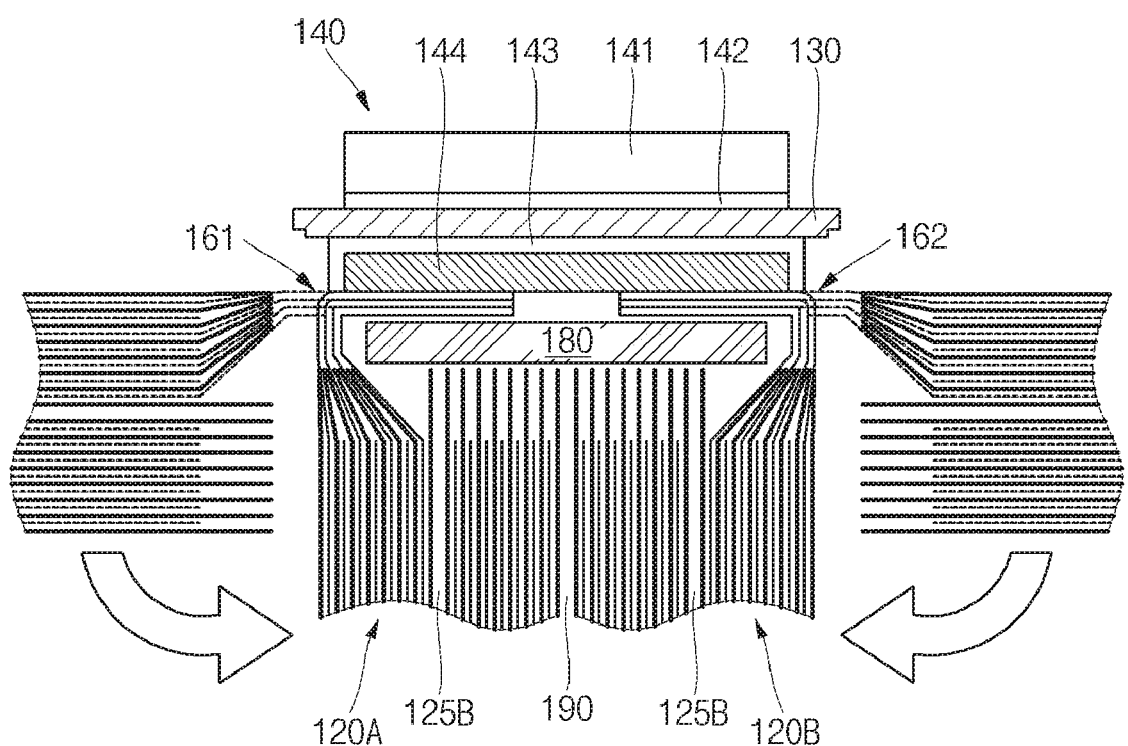

SECONDARY BATTERY HAVING SYMMETRIC MULTI-TABS

CROSS-REFERENCE TO RELATED APPLICATION(S)

This application is a National Phase Patent Application of International Patent Application Number PCT/KR2018/001684, filed on Feb. 8, 2018, which claims priority of Korean Patent Application No. 10-2017-0023770, filed Feb. 22, 2017. The entire contents of both of which are incorporated herein by reference.

TECHNICAL FIELD

Various embodiments of the present invention relate to a secondary battery having symmetric multi-tabs.

BACKGROUND ART

A secondary battery is a power storage system that converts electric energy into chemical energy and stores the converted energy to provide high energy density. Unlike primary batteries that cannot be recharged, a secondary battery is rechargeable and is being widely used in IT devices, such as a smart phone, a cellular phone, a notebook computer, or a tablet PC. In recent years, electric vehicles are drawing attention for protection of environmental contamination, and a trend toward the use of high-capacity secondary batteries for electric vehicles is growing. The secondary battery needs to have high density, high output and stability characteristics.

The above information disclosed in this Background section is only for enhancement of understanding of the background of the described technology and therefore it may contain information that does not form the prior art that is already known in this country to a person of ordinary skill in the art.

Technical Problems to be Solved

Various embodiments of the present invention provide a secondary battery. That is to say, various embodiments of the present invention provide a secondary battery capable of increasing the insulation level of first and second multi-tabs by forming the first and second multi-tabs of first and second electrode assemblies to be symmetric to each other.

Technical Solutions

In accordance with an aspect of the present invention, there is provided a secondary battery including a case, a first electrode assembly accommodated inside the case and having first multi-tabs, a second electrode assembly accommodated in parallel with the first electrode assembly inside the case and having second multi-tabs, and a cap plate closing the case and having electrode terminals electrically connected to the first and second multi-tabs of the first and second electrode assemblies, wherein the first and second multi-tabs are formed so as to be symmetrical with respect to the boundary area between the first and second electrode assemblies.

The first and second multi-tabs may be closer to the case than to the boundary area.

The first and second multi-tabs may be extended to the electrode terminals from regions closer to the case than to the boundary area.

The first electrode assembly may include a first winding center, the second electrode assembly may include a second winding center, the case may include a first long side portion closely contacting the first electrode assembly and a second long side portion closely contacting the second electrode assembly, the first multi-tab may be located between the first winding center and the first long side portion, and the second multi-tab may be located between the second winding center and the second long side portion.

The first and second multi-tabs may be located only regions closer to the boundary area than to the case, respectively.

The first and second multi-tabs may be extended to the electrode terminals from regions closer to the boundary area than to the case, respectively. The first and second multi-tabs may include first regions extended from the first and second electrode assemblies, second regions extended from the first regions so as to be adjacent to the case, and third regions bent from the second regions to be connected to the electrode terminal, respectively.

The first electrode assembly may include a first winding center, the second electrode assembly may include a second winding center, the first multi-tab may be located between the first winding center and the boundary area, and the second multi-tab may be located between the second winding center and the boundary area.

The first and second electrode assemblies may further include insulation plates covered by the first and second multi-tabs and the electrode terminals, respectively.

The first and second multi-tabs may include outer multi-tabs located at regions closer to the case than to the boundary area, and inner multi-tabs located at regions closer to boundary area than to the case.

Advantageous Effects

As described above, according to various embodiments of the present invention, a secondary battery is provided. That is to say, according to various embodiments of the present invention, a secondary battery is provided, which can increase the insulation level of first and second multi-tabs by forming the first and second multi-tabs of first and second electrode assemblies to be symmetrical to each other.

For example, according to an embodiment of the present invention, the first and second multi-tabs of the first and second electrode assemblies are extended and bent to be symmetrical with each other from regions adjacent to the case to electrode terminals with respect to the boundary area (or the contact area) between electrode terminals or the first and second electrode assemblies, thereby preventing the first and second multi-tabs and regions having polarities opposite to the first and second multi-tabs (e.g., the case, the cap plate and/or predetermined regions of the first and second electrode assemblies) from being electrically short-circuited to each other in the first and second electrode assemblies.

For another example, according to an embodiment of the present invention, the first and second multi-tabs of the first and second electrode assemblies are extended and bent to be symmetrical with each other from regions adjacent to the boundary area (or the contact area) between electrode terminals or the first and second electrode assemblies to electrode terminals with respect to the boundary area (or the contact area) between electrode terminals or the first and second electrode assemblies, thereby preventing the first and second multi-tabs and regions having polarities opposite to the first and second multi-tabs (e.g., the case, the cap plate and/or predetermined regions of the first and second electrode assemblies) from being electrically short-circuited to each other in the first and second electrode assemblies.

For still another example, according to an embodiment of the present invention, the first and second multi-tabs located at one side of the first and second electrode assemblies are extended and bent to be symmetrical with each other from regions adjacent to the case to the boundary area (or the contact area) between electrode terminals or the first and second electrode assemblies to electrode terminals, and the first and second multi-tabs located at the other side of the first and second electrode assemblies are extended and bent to be symmetrical with each other from regions adjacent to the boundary area between the first and second electrode assemblies to the electrode terminals, thereby improving coupling reliability between the first and second electrode assemblies and the electrode terminals and preventing the first and second multi-tabs and the regions having polarities opposite to the first and second multi-tabs (e.g., the case, the cap plate and/or predetermined regions of the first and second electrode assemblies) from being electrically short-circuited to each other.

BRIEF DESCRIPTION OF DRAWINGS

FIGS. 5A to 5C are schematic views illustrating a manufacturing method of a secondary battery having symmetrical multi-tabs according to an embodiment of the present invention.

BEST MODE FOR CARRYING OUT THE INVENTION

Figure 1A:
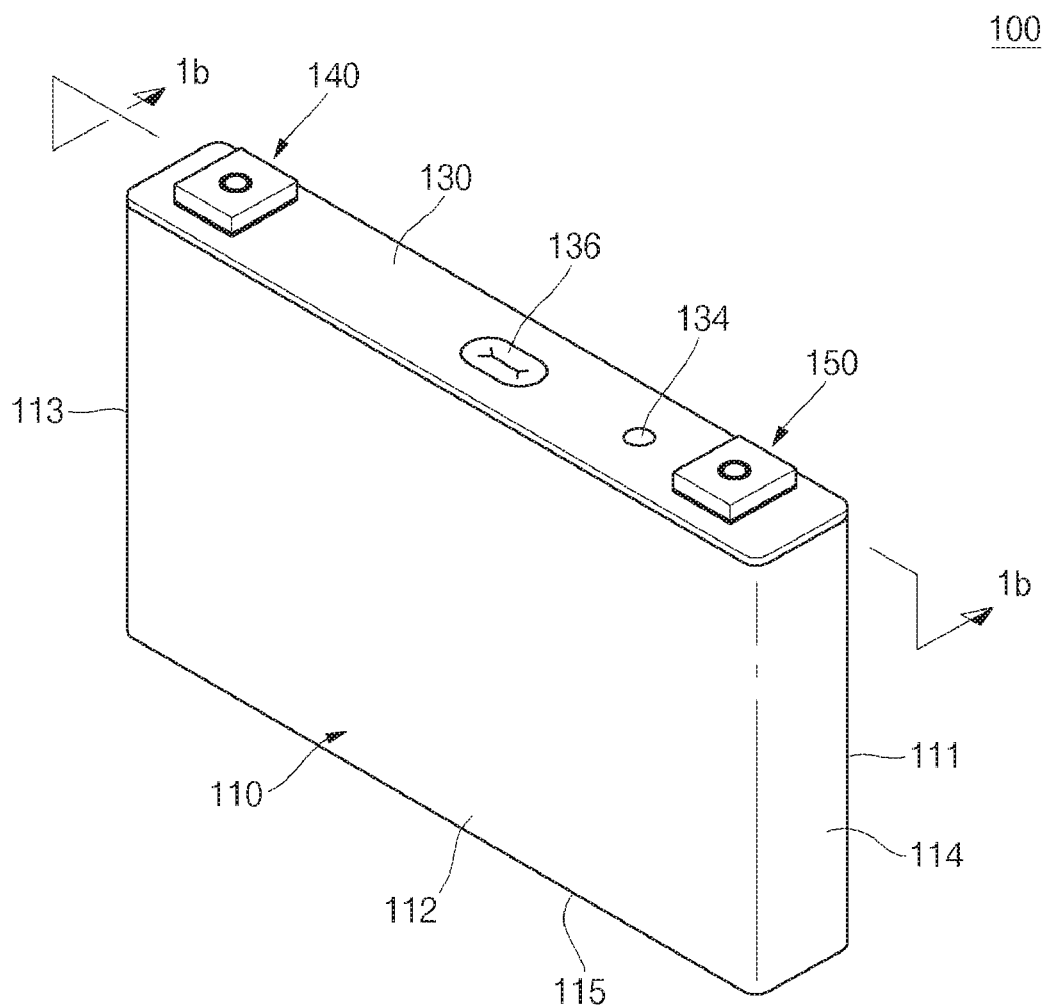
FIGS. 1A, 1B and 1C are a perspective view, a cross-sectional view and an exploded perspective view of a secondary battery according to an embodiment of the present invention.

Hereinafter, a preferred embodiment of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

In addition, as used herein, the term "separator" includes a separator generally used in liquid electrolyte batteries using a liquid electrolyte having a low affinity to the separator. Further, as used herein, the term "separator" may include an intrinsic solid polymer electrolyte in which the electrolyte is strongly bound to the separator to then be recognized as being the same as the separator, and/or a gel solid polymer. Therefore, the meaning of the separator should be defined as specifically defined in the specification of the present disclosure.

Figure 1B:
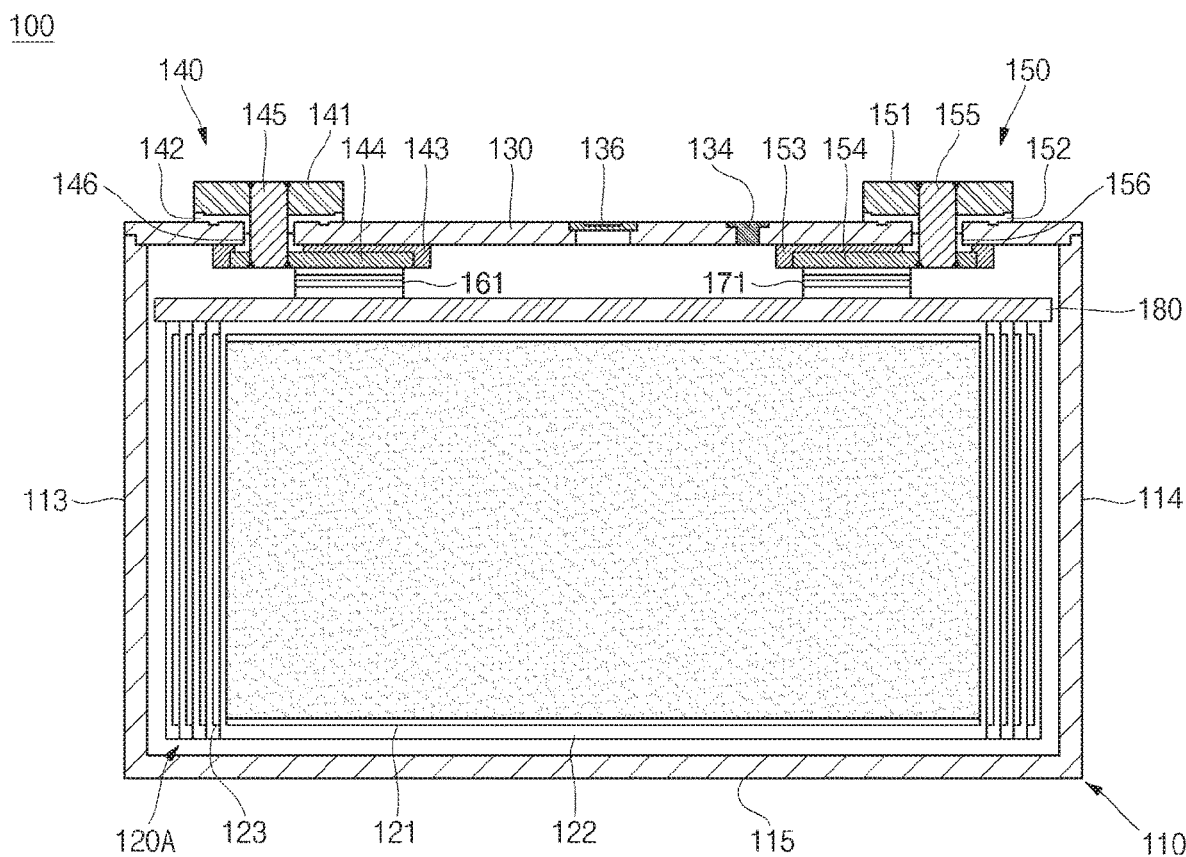
Figure 1C:
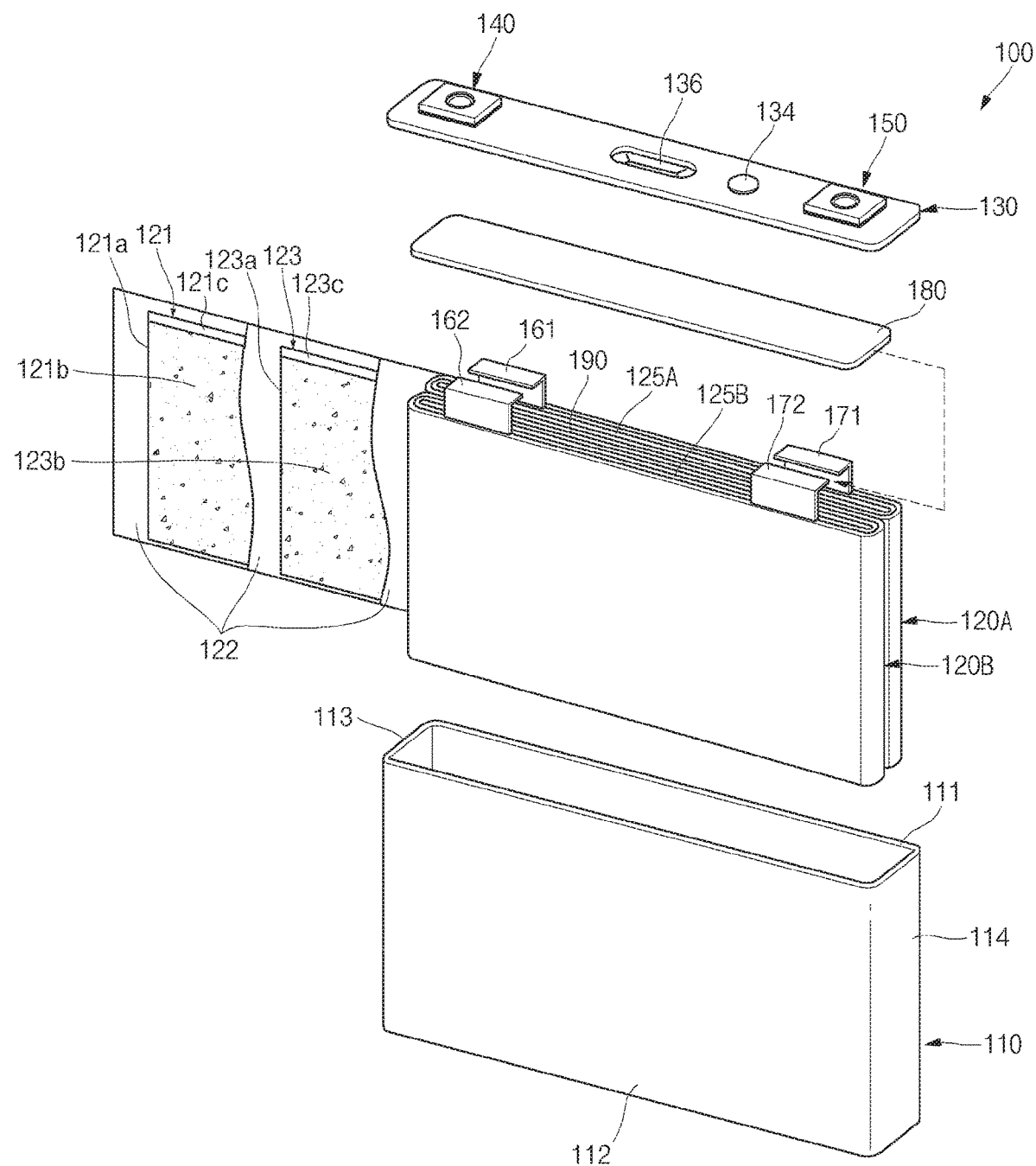

Referring to FIGS. 1A, 1B and 1C, a perspective view, a cross-sectional view and an exploded perspective view of a secondary battery according to an embodiment of the present invention are illustrated.

As shown in FIGS. 1A, 1B and 1C, the secondary battery 100 according to an embodiment of the present invention may include a case 110, first and second electrode assemblies 120A and 120B, a cap plate 130, a first electrode terminal 140 and a second electrode terminal 150.

The case 110 may be made of a conductive metal, such as aluminum, an aluminum alloy or nickel plated steel, and may be substantially shaped of a hexahedron having an opening through which the electrode assemblies 120A and 120B can be inserted into the case 110. While the opening is not shown in FIG. 1B because the case 110 and the cap plate 130 are assembled with each other, it may be a substantially opened part of a top portion of the case 110. Meanwhile, since the internal surface of the case 110 is insulated, the case 110 may be insulated from the first and second electrode assemblies 120A and 120B. Here, the case 110 may also referred to as a can in some instances.

The case 110 may include a first long side portion 111 having a relatively large area, a second long side portion 112 facing the first long side portion 111 and having a relatively large area, a first short side portion 113 connecting first ends of the first and second long side portions 111 and 112 and having a relatively small area, a second short side portion 114 facing the third short side portion 113, connecting second ends of the first and second long side portions 111 and 112 and having a relatively small area, and a bottom portion 115 connecting the first and second long side portions 111 and 112 and the first and second short side portions 113 and 114.

The first electrode assembly 120A is assembled inside the case 110. Particularly, one surface of the first electrode assembly 120A is coupled to the case 110 in a state in which it is brought into close contact/contact with the first long side portion 111 of the case 110. The first electrode assembly 120A may be manufactured by winding or laminating a stacked structure including a first electrode plate 121, a separator 122, and a second electrode plate 123, which are thin plates or layers. Here, the first electrode plate 121 may operate as a positive electrode and the second electrode plate 123 may operate as a negative electrode. Of course, polarities of the first electrode plate 121 and the second electrode plate 123 may be reversed. In addition, if the first electrode assembly 120A is manufactured in a winding type, a first winding center 125A (or a first winding leading edge) where winding is started may be located at the center of the first electrode assembly 120A.

The first electrode plate 121 may include a first current collector plate 121a made of a metal foil or mesh including aluminum or an aluminum alloy, a first coating portion 121b having a first electrically active material, such as a transition metal oxide, on the first current collector plate 121a, a first non-coating portion (or a first uncoated portion) 121c on which the first electrically active material is not coated, and a first electrode first multi-tab 161 outwardly (or upwardly) extended from the first non-coating portion 121c) and electrically connected to the first electrode terminal 140. Here, the first electrode first multi-tab 161 may become a passageway of the flow of current between the first electrode plate 121 and the first electrode terminal 140 and may include multiple first electrode first tabs arranged in a stacked type to be referred to as multi-tabs. In addition, the first electrode first multi-tab 161 may be provided such that the first non-coating portion 121c is upwardly extended/protruded. Here, the first electrode may be a positive electrode.

The second electrode plate 123 may include a second current collector plate 123a made of a metal foil or mesh including copper, a copper alloy, nickel or a nickel alloy, a second coating portion 123b having a second electrically active material, such as graphite or carbon, on the second current collector plate 123a, a second non-coating portion (or a second uncoated portion) 123c on which the second electrically active material is not coated, and a second electrode first multi-tab 171 outwardly (or upwardly) extended from the second non-coating portion 123c and electrically connected to the second electrode terminal 150. Here, the second electrode first multi-tab 171 may become a passageway of the flow of current between the second electrode plate 123 and the second electrode terminal 150 and may include multiple second electrode first tabs arranged in a stacked type to be referred to as multi-tabs. In addition, the second electrode first multi-tab 171 may be provided such that the second non-coating portion 123c is upwardly extended/protruded. Here, the second electrode may be a negative electrode.

The separator 122 may be positioned between the first electrode plate 121 and the second electrode plate 123 to prevent an electrical short circuit from occurring between the first electrode plate 121 and the second electrode plate 123 and to allow movement of lithium ions. The separator 122 may include polyethylene, polypropylene or a composite film of polyethylene and polypropylene. However, the material of the separator 122 is not limited to the specific materials listed herein. In addition, if an inorganic solid electrolyte is used, the separator 122 may not be provided.

The second electrode assembly 120B may have substantially the same structure, type and/or material as those of the first electrode assembly 120A. Therefore, detailed descriptions of the second electrode assembly 120B will be omitted. However, one surface of the second electrode assembly 120B is coupled to the case 110 in a state in which it is brought into close contact/contact with the second long side portion 112 of the case 110. In addition, if the second electrode assembly 120B is manufactured in a winding type, a second winding center 125B (or a second winding leading edge) where winding is started may be located at the center of the second electrode assembly 120B.

In addition, the first and second electrode assemblies 120A and 120B include a boundary area where the first and second electrode assemblies 120A and 120B face each other inside the case 110 or a contact area 190 where the first and second electrode assemblies 120A and 120B are brought into close contact/contact with each other. That is to say, the first and second electrode assemblies 120A and 120B may be assembled inside the case 110 in a state in which they are brought into close contact/contact with each other.

Meanwhile, the second electrode assembly 120B may include a first electrode second multi-tab 162 outwardly (or upwardly) extended from the first electrode plate 121 and electrically connected to the first electrode terminal 140. Here, the first electrode second multi-tab 162 may become a passageway of the flow of current between the first electrode plate 121 and the first electrode terminal 140 and may include multiple first electrode second tabs arranged in a stacked type to be referred to as multi-tabs. In addition, the first electrode second multi-tab 162 may be provided such that the first non-coating portion 121c is upwardly extended/protruded.

In addition, the second electrode assembly 120B may include a second electrode second multi-tab 172 outwardly (or upwardly) extended from the second electrode plate 123 and electrically connected to the second electrode terminal 150. Here, the second electrode second multi-tab 172 may become a passageway of the flow of current between the second electrode plate 123 and the second electrode terminal 150 and may include multiple second electrode second tabs arranged in a stacked type to be referred to as multi-tabs. In addition, the second electrode second multi-tab 172 may be provided such that the second non-coating portion 123c is upwardly extended/protruded.

Meanwhile, an axis of each of the first and second winding centers 125A and 125B of the first and second electrode assemblies 120A and 120B, that is, a winding axis, is substantially parallel or horizontal to a terminal axis of each of the first and second electrode terminals 140 and 150. Here, the winding axis and the terminal axis may mean an up-and-down axis in FIGS. 1B and 1C, and the expression "the winding axis and the terminal axis being substantially parallel or horizontal to each other" may mean that the winding axis and the terminal axis may not meet each other even if the winding axis and the terminal axis are extended or may meet each other when the winding axis and the terminal axis are extraordinarily extended.

In addition, as described above, the first and second multi-tabs 161 and 162 extended and bent a predetermined length are positioned between the first and second electrode assemblies 120A and 120B and the first electrode terminal 140, and the first and second multi-tabs 171 and 172 extended and bent a predetermined length are positioned between the first and second electrode assemblies 120A and 120B and the second electrode terminal 150. That is to say, the first and second multi-tabs 161 and 162 located at one side may be extended and bent from top ends of the first and second electrode assemblies 120A and 120B toward the first electrode terminal 140 so as to be substantially symmetrical with each other to then be connected or welded to the first electrode terminal 140. In addition, the first and second multi-tabs 171 and 172 located at the other side may also be extended and bent from the top ends of the first and second electrode assemblies 120A and 120B toward the second electrode terminal 150 so as to be substantially symmetrical with each other to then be connected or welded to the second electrode terminal 150.

Substantially, each of the first and second multi-tabs 161 and 162 located at one side may be the first non-coating portion 121c itself, which is a region of the first electrode plate 121, without a first active material coated thereon, or may be a separate member connected to the first non-coating portion 121c. Here, the separate member may be made of one selected from the group consisting of aluminum, an aluminum alloy, nickel, a nickel alloy, copper, a copper alloy, and equivalents thereof.

In addition, each of the first and second multi-tabs 171 and 172 located at the other side may be the second non-coating portion 123c itself, which is a region of the second electrode plate 123, without a second active material coated thereon, or may be a separate member connected to the second non-coating portion 123c. Here, the separate member may be made of one selected from the group consisting of nickel, a nickel alloy, copper, a copper alloy, aluminum, an aluminum alloy, and equivalents thereof.

Since the first and second winding axes of the first and second electrode assemblies 120A and 120B and the terminal axes of the first and second electrode terminals 140 and 150 are substantially parallel or horizontal to each other, as described above, an electrolyte injection direction and the winding axes are also substantially parallel or horizontal to each other. Therefore, the first and second electrode assemblies 120A and 120B exhibit high electrolyte impregnation capability when an electrolyte is injected and internal gases are rapidly transferred to a safety vent 136 during overcharge, enabling the safety vent 136 to quickly operate.

In addition, the first and second multi-tabs 161/171 and 162/172 (or uncoated portions or separate members) of the first and second electrode assemblies 120A and 120B are extended and bent to be are directly electrically connected to the first and second electrode terminals 140 and 150, which shortens electrical paths, thereby reducing internal resistance of the secondary battery 100 while reducing the number of components of the secondary battery 100.

In particular, since the first and second multi-tabs 161/171 and 162/172 (or uncoated portions or separate members) of the first and second electrode assemblies 120A and 120B are directly electrically connected to first and second electrode terminals 140 and 150 while being symmetrical with each other, unnecessary electrical short circuits between the first and second multi-tabs 161/171 and 162/172 and regions having polarities opposite to the first and second multi-tabs 161/171 or 162/172 (e.g., the case, cap plate and/or predetermined portions of the first and second electrode assemblies 120A and 120B can be prevented. In other words, insulation levels of the first and second multi-tabs 161/171 and 162/172 can be improved by the symmetrical structure of the first and second multi-tabs 161/171 and 162/172.

The first and second electrode assemblies 120A and 120B may be accommodated in the case 110 together with an electrolyte. The electrolyte may include an organic solvent, such as ethylene carbonate (EC), propylene carbonate (PC), diethyl carbonate (DEC), ethylmethyl carbonate (EMC), or dimethyl carbonate (DMC), and a lithium salt such as $LiPF_6$ or $LiBF_4$. In addition, the electrolyte may be in a liquid, sold or gel phase.

The cap plate 130 may be substantially shaped of a rectangle having lengths and widths and may be coupled to the case 110. That is to say, the cap plate 130 may seal an opening of the case 110 and may be made of the same material as the case 110. For example, the cap plate 130 may be coupled to the case 110 by laser and/or ultrasonic welding. Here, the cap plate 130 may also be referred to as a cap assembly in some instances.

The cap plate 130 may include a plug 134 closing an electrolyte injection hole, and a safety vent 136 clogging a vent hole. In addition, the safety vent 136 may include a notch configured to be easily opened at a preset pressure.

The first electrode terminal 140 may include a first electrode terminal plate 141 positioned on a top surface of the cap plate 130, a first upper insulation plate 142 positioned between the first electrode terminal plate 141 and the cap plate 130, a first lower insulation plate 143 positioned on a bottom surface of the cap plate 130, a first current collector plate 144 positioned on a bottom surface of the first lower insulation plate 143, and a first electrode terminal pillar 145 electrically connecting the first electrode terminal plate 141 and the first current collector plate 144. In addition, the secondary battery 100 according to an embodiment of the present invention may further include a first seal insulation gasket 146 insulating the cap plate 130 and the first electrode terminal pillar 145 from each other.

Here, the first and second multi-tabs 161 and 162 of the first and second electrode assemblies 120A and 120B may be electrically connected to the first current collector plate 144 of the first electrode terminal 140 so as to be symmetrical with each other.

The second electrode terminal 150 may include a second electrode terminal plate 151 positioned on the top surface of the cap plate 130, a second upper insulation plate 152 positioned between the second electrode terminal plate 151 and the cap plate 130, a second lower insulation plate 153 positioned on the bottom surface of the cap plate 130, a second current collector plate 154 positioned on a bottom surface of the second lower insulation plate 153, and a second electrode terminal pillar 145 electrically connecting the second electrode terminal plate 151 and the second current collector plate 154. In addition, the secondary battery 100 according to an embodiment of the present invention may further include a second seal insulation gasket 156 insulating the cap plate 130 and the second electrode terminal pillar 155 from each other.

Here, the first and second multi-tabs 171 and 172 of the first and second electrode assemblies 120A and 120B may be electrically connected to the second current collector plate 154 of the second electrode terminal 150 so as to be symmetrical with each other.

Meanwhile, in an embodiment of the present invention, an insulation plate 180 is further positioned between each of the first and second electrode assemblies 120A and 120B, the first and second multi-tabs 161/171 and 162/172 and the first and second electrode terminals 140 and 150, thereby preventing the first and second multi-tabs 161/171 or 162/172 and regions having polarities opposite to the first and second multi-tabs 161/171 or 162/172 (e.g., the case, the cap plate and/or the predetermined regions of the first and second electrode assemblies) from being electrically short-circuited to each other. The insulation plate 180 may be made of, for example, but not limited to, a super engineering plastic, such as polyphenylene sulfide (PPS), having excellent dimension stability and maintaining a high strength and stiffness up to approximately 220° C.

As described above, in the secondary battery 100 according to the embodiment of the present invention, the first and second multi-tabs 161/171 and 162/172 of the first and second electrode assemblies 120A and 120B are configured such that they are extended and bent to be symmetrical with each other with respect to the boundary area (or contact area) 190 between the first and second electrode terminals 140 and 150 or the first and second electrode assemblies 120A and 120B), thereby preventing the first and second multi-tabs 161/171 or 162/172 and the regions having polarities opposite to the first and second multi-tabs 161/171 or 162/172 (e.g., the case 110, the cap plate 130 and/or the predetermined regions of the first and second electrode assemblies 120A and 120B) from being electrically short-circuited to each other.

That is to say, if the first and second multi-tabs 161/171 and 162/172 are configured to be symmetrical with each other with respect to the boundary area 190 between the first and second electrode terminals 140 and 150 or the first and second electrode assemblies 120A and 120B), a probability of electrical short circuits occurring between the first and second multi-tabs 161/171 and 162/172 and the case 110, the cap plate 130 and/or the predetermined regions of the first and second electrode assemblies 120A and 120B having polarities opposite to the first and second multi-tabs 161/171 or 162/172, may be increased. However, like in the embodiment of the present invention, if the first and second multi-tabs 161 and 162 are configured to be symmetrical with each other, the probability of occurrence of such electrical short circuits can be reduced.

For example, a probability of electrical short circuits occurring between the positive electrode first and second multi-tabs 161 and 162 configured to be symmetrical with each other and the negative electrode non-coating portions 123c of the first and second electrode assemblies 120A and 120B, is smaller than a probability of electrical short circuits occurring between positive electrode first and second multi-tabs configured to be asymmetrical with each other and negative electrode non-coating portions of first and second electrode assemblies (?), but aspects of the present invention are not limited thereto. In addition, for example, a probability of electrical short circuits occurring between the negative electrode first and second multi-tabs 171 and 172 configured to be symmetrical with each other and the positive electrode non-coating portions 121c of the first and second electrode assemblies 120A and 120B, is smaller than a probability of electrical short circuits occurring between negative electrode first and second multi-tabs configured to be asymmetrical with each other and positive electrode non-coating portions of first and second electrode assemblies (?), but aspects of the present invention are not limited thereto.

In other words, if the first and second multi-tabs 161/171 and 162/172 of the first and second electrode assemblies 120A and 120B are configured to be symmetrical with each other, the number or area of management regions for preventing electrical short circuits between the first and second multi-tabs 161/171 or 162/172 and the regions having opposite polarities, that is, the case 110, the cap plate 130 and/or the predetermined regions of the first and second electrode assemblies 120A and 120B, may be reduced. Accordingly, the electrical short circuits between the first and second multi-tabs 161/171 and 162/172 and the regions having the opposite polarities can be easily prevented. However, if the first and second multi-tabs 161/171 and 162/172 of the first and second electrode assemblies 120A and 120B are configured to be asymmetrical with each other, the number or area of management regions for preventing electrical short circuits between the first and second multi-tabs 161/171 or 162/172 and the regions having opposite polarities, may be increased. Accordingly, it is difficult to prevent the electrical short circuits between the first and second multi-tabs 161/171 and 162/172 and the regions having the opposite polarities.

Figure 2A:
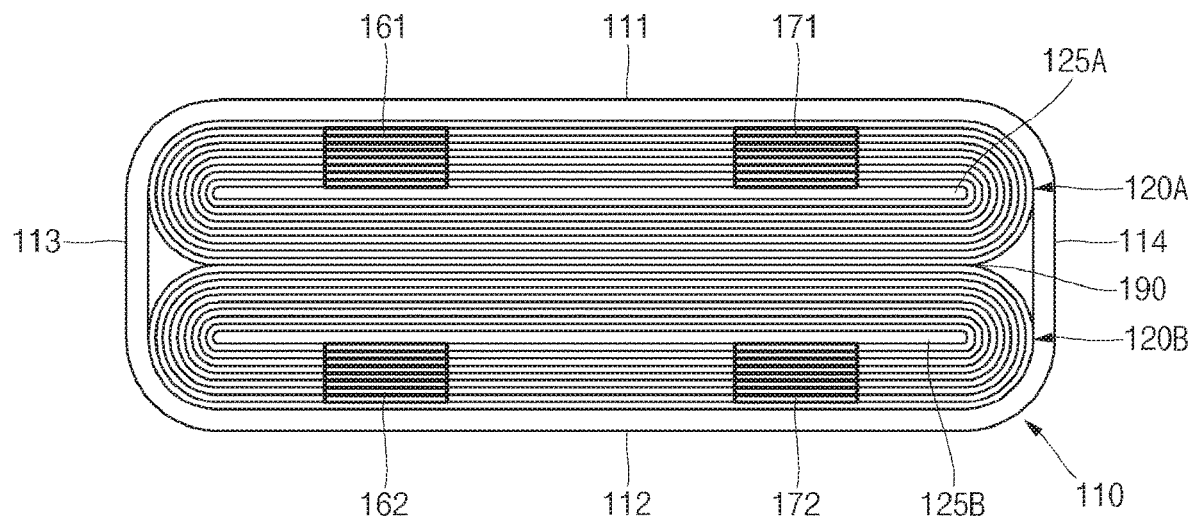
FIGS. 2A and 2B are a plan view and a partial cross-sectional view of first and second electrode assemblies in a secondary battery having symmetrical multi-tabs according to an embodiment of the present invention.
Figure 2B:
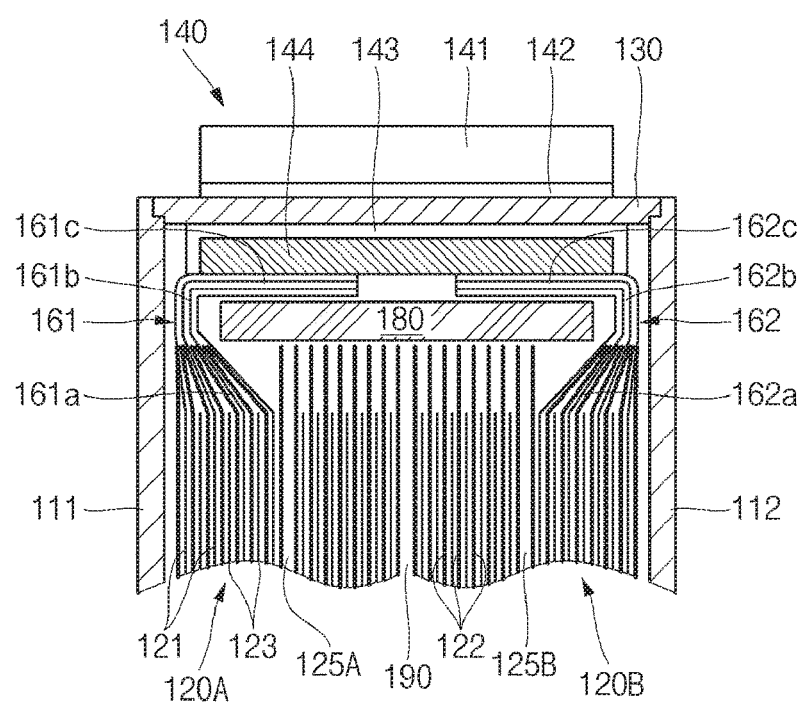

Referring to FIGS. 2A and 2B, a plan view and a partial cross-sectional view of first and second electrode assemblies in a secondary battery having symmetrical multi-tabs according to an embodiment of the present invention are illustrated.

As shown in FIGS. 2A and 2B, the first electrode assembly 120A may include a first winding center 125A (or a first winding leading edge) where winding is started, and the second electrode assembly 120B may also include a second winding center 125B (or a second winding leading edge) where winding is started. In addition, the first and second electrode assemblies 120A and 120B may have a boundary area (or contact area) 190 therebetween.

In the following description, outer regions of the first and second electrode assemblies 120A and 120B may mean regions spaced apart from the boundary area 190 between the first and second electrode assemblies 120A and 120B and closer to the first and second long side portions 111 or 112 of the case 110, and inner regions of the first and second electrode assemblies 120A and 120B may mean regions spaced apart from the first and second long side portions 111 or 112 of the case 110 and closer to the boundary area 190 between the first and second electrode assemblies 120A and 120B. In addition, in the following description, the outer regions of the first and second electrode assemblies 120A and 120B may mean regions from the first and second winding centers 125A or 125b to the first and second long side portions 111 or 112 of the case 110, and the inner regions of the first and second electrode assemblies 120A and 120B may mean regions from the first and second winding centers 125A or 125B to the boundary area 190 between the first and second electrode assemblies 120A and 120B. It should be understood that definitions of the outer and inner regions of the first and second electrode assemblies 120A and 120B can be commonly applied to all embodiments of the present invention.

As shown in FIG. 2A, the first and second electrode assemblies 120A and 120B may include the first and second multi-tabs 161/162 or 171/172 located at their outer regions so as to be symmetrical with each other with respect to the boundary area 190. The first multi-tabs 161 and 171 may be located only at, for example, but not limited to, the outer region of the first electrode assembly 120A. That is to say, the first multi-tabs 161 and 171 may not be located at the inner regions of the first electrode assembly 120A. In addition, the second multi-tabs 162 and 172 may also be located only at the outer regions of the second electrode assembly 120B. That is to say, the second multi-tabs 162 and 172 may not be located at the inner regions of the second electrode assembly 120B. More specifically, as shown in FIG. 2A, the first multi-tabs 161 and 171 may be located only at roughly upper regions of the first winding center 125A in the first electrode assembly 120A (i.e., regions adjacent to the first long side portion 111 of the case 110), and the second multi-tabs 162 and 172 may be located only at roughly lower regions of the second winding center 125B in the second electrode assembly 120B (i.e., regions adjacent to the second long side portion 112 of the case 110). Therefore, the maximum distance between the first and second multi-tabs 161/162 or 171/172 may be equal to or slightly smaller than the maximum overall width (or thickness) of the first and second electrode assemblies 120A and 120B.

In addition, as shown in FIG. 2B, the first and second electrode assemblies 120A and 120B may include the first and second multi-tabs 161 and 162 extended and bent from the outer regions so as to be symmetrical with each other with respect to the boundary area 190 or the electrode terminal 140. The first and second multi-tabs 161 and 162 may be extended and bent from, for example, but not limited to, the outer regions of the first and second electrode assemblies 120A and 120B to the electrode terminal 140 so as to be symmetrical with each other with respect to the boundary area 190. In other words, the first and second multi-tabs 161 and 162 may be extended and bent to the electrode terminal 140 from regions closer to the case 110 (i.e., the first long side portion or the second long side portion) than to the boundary area 190 between the first and second electrode assemblies 120A and 120B, respectively.

Still in other words, the first and second multi-tabs 161 and 162 may include first regions 161a and 162a extended from the outer regions of the first and second electrode assemblies 120A and 120B, second regions 161b and 162b extended from the first regions 161a and 162a to be adjacent to the case 110, and third regions 161c and 162c bent from the second regions 161b and 162b to be electrically connected to the electrode terminal 140, respectively.

Here, as the first regions 161a and 162a get closer from the case 110 (i.e., the first long side portion or the second long side portion) to the boundary area 190 between the first and second electrode assemblies 120A and 120B, bending angles of the first regions 161a and 162a are more increased. In addition, the second regions 161b and 162b may be substantially parallel with a longitudinal direction of the case 110 (i.e., the first long side portion or the second long side portion). In addition, the third regions 161c and 162c may be connected to the electrode terminal 140 while being bent roughly at right angle from the second regions 161b and 162b.

In addition, since the insulation plate 180 is further located between the first and second electrode assemblies 120A and 120B and the first and second multi-tabs 161 and 162, and the electrode terminal 140, electrical short circuits may not occur between the first and second multi-tabs 161 and 162, and the case, the cap plate and/or the predetermined regions of the first and second electrode assemblies, which have polarities opposite to the first and second multi-tabs 161 and 162. In particular, the insulation plate 180 is placed roughly on the separator 122 of each of the first and second electrode assemblies 120A and 120B.

As described above, according to the embodiment of the present invention, the first and second multi-tabs 161 and 162 are extended and bent from the outer regions of the first and second electrode assemblies 120A and 120B to the electrode terminal 140 so as to be symmetrical with each other with respect to the electrode terminal 140 or the boundary area 190 between the first and second electrode assemblies 120A and 120B, thereby suppressing electrical short circuits between the first and second multi-tabs 161 and 162 and the regions having polarities opposite thereto (e.g., the case, the cap plate and/or the predetermined regions of the first and second electrode assemblies).

Figure 3A:
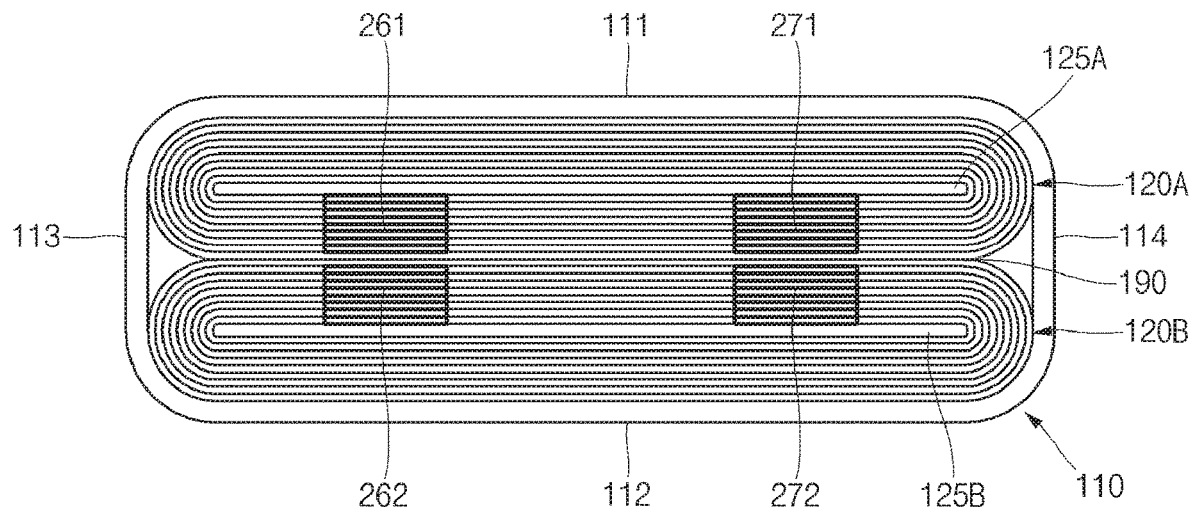
FIGS. 3A and 3B are a plan view and a partial cross-sectional view of first and second electrode assemblies in a secondary battery having symmetrical multi-tabs according to another embodiment of the present invention.
Figure 3B:
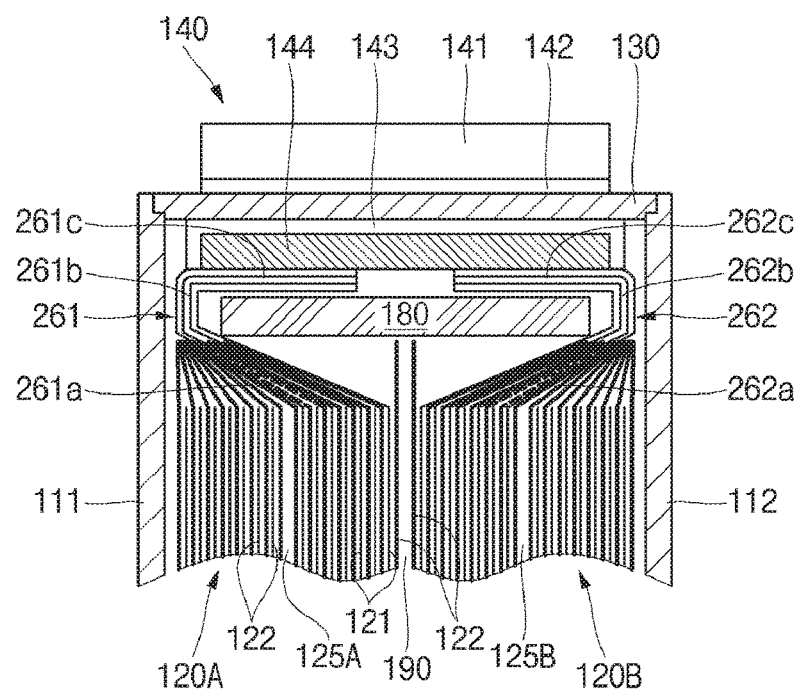

Referring to FIGS. 3A and 3B, a plan view and a partial cross-sectional view of first and second electrode assemblies in a secondary battery having symmetrical multi-tabs according to another embodiment of the present invention are illustrated.

As shown in FIG. 3A, the first and second electrode assemblies 120A and 120B may include first and second multi-tabs 261/262 or 271/272 located at their inner regions so as to be symmetrical with each other with respect to the boundary area 190 between the first and second electrode assemblies 120A and 120B. The first multi-tabs 261 and 271 may be located only at, for example, but not limited to, the inner regions of the first electrode assembly 120A. That is to say, the first multi-tabs 261 and 271 may not be located at the outer regions of the first electrode assembly 120A. In addition, the second multi-tabs 262 and 272 may also be located only at the inner regions of the second electrode assembly 120B. That is to say, the second multi-tabs 262 and 272 may not be located at the outer regions of the second electrode assembly 120B. More specifically, as shown in FIG. 3A, the first multi-tabs 261 and 271 may be located only at roughly lower regions of the first winding center 125A in the first electrode assembly 120A (i.e., regions adjacent to the boundary area 190), and the second multi-tabs 262 and 272 may be located only at roughly upper regions of the second winding center 125B in the second electrode assembly 120B (i.e., regions adjacent to the boundary area 190). Therefore, the maximum distance between the first and second multi-tabs 261/262 or 271/272 may be equal to or slightly greater than the minimum distance between the first and second electrode assemblies 120A and 120B.

In addition, as shown in FIG. 3B, the first and second electrode assemblies 120A and 120B may include the first and second multi-tabs 261 and 262 extended and bent from the inner regions so as to be symmetrical with each other with respect to the boundary area 190 between first and second electrode assemblies 120A and 120B or the electrode terminal 140. The first and second multi-tabs 261 and 262 may be extended and bent, for example, but not limited to, from the inner regions of the first and second electrode assemblies 120A and 120B to the electrode terminal 140 so as to be symmetrical with each other, respectively. In other words, the first and second multi-tabs 261 and 262 may be extended and bent to the electrode terminal 140 from regions closer to the boundary area 190 between the first and second electrode assemblies 120A and 120B than to the first long side portion 111 or the second long side portion 112 of the case 110.

Still in other words, the first and second multi-tabs 261 and 262 may include first regions 261a and 262a extended from the inner regions of the first and second electrode assemblies 120A and 120B, second regions 261b and 262b extended from the first regions 261a and 262a to be adjacent to the case 110, and third regions 261c and 262c bent from the second regions 261b and 262b to be electrically connected to the electrode terminal 140, respectively.

Here, as the first regions 261a and 262a get closer from the case 110 to the boundary area 190 between the first and second electrode assemblies 120A and 120B, bending angles of the first regions 261a and 262a are more increased. In addition, the second regions 261b and 262b may be substantially parallel with a longitudinal direction of the case 110. In addition, the third regions 261c and 262c may be connected to the electrode terminal 140 while being bent roughly at right angle from the second regions 261b and 262b.

In addition, since the insulation plate 180 is further located between the first and second electrode assemblies 120A and 120B, the first and second multi-tabs 261 and 262 and the electrode terminal 140, electrical short circuits may not occur between the first and second multi-tabs 261 and 262, and the case, the cap plate and/or the predetermined regions of the first and second electrode assemblies, which have polarities opposite to the first and second multi-tabs 261 and 262. In particular, the insulation plate 180 is placed roughly on the first regions 261a and 262a of the first and second multi-tabs 261 and 262.

As described above, according to the embodiment of the present invention, the first and second multi-tabs 261 and 262 are extended and bent from the inner regions of the first and second electrode assemblies 120A and 120B to the electrode terminal 140 so as to be symmetrical with each other with respect to the electrode terminal 140 or the boundary area 190 between the first and second electrode assemblies 120A and 120B, thereby suppressing electrical short circuits between the first and second multi-tabs 261 and 262 and the regions having polarities opposite thereto (e.g., the case, the cap plate and/or the predetermined regions of the first and second electrode assemblies).

Figure 4A:
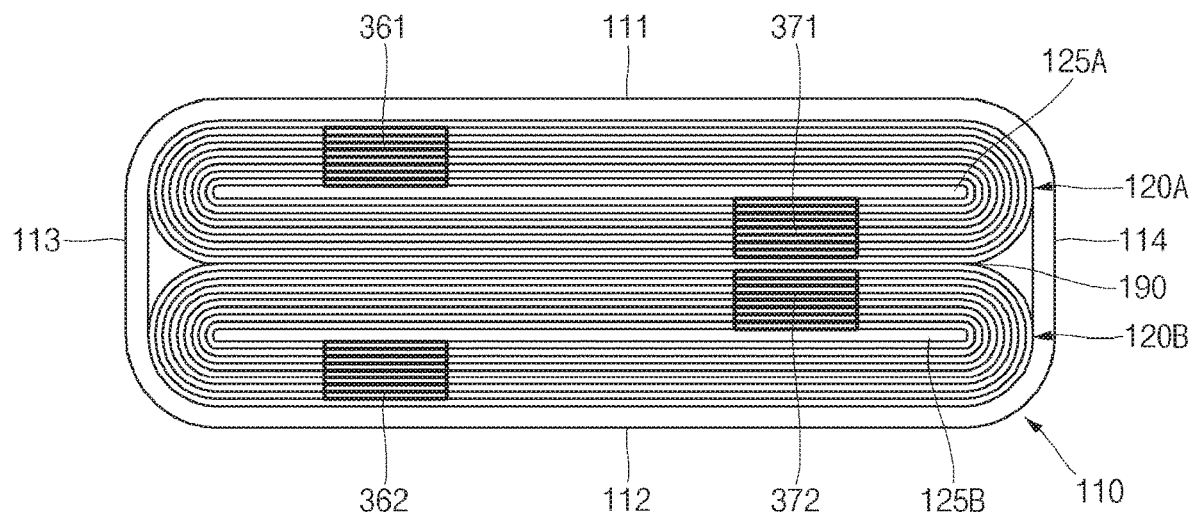
FIGS. 4A and 4B are a plan view and a perspective view of first and second electrode assemblies in a secondary battery having symmetrical multi-tabs according to another embodiment of the present invention.
Figure 4B:
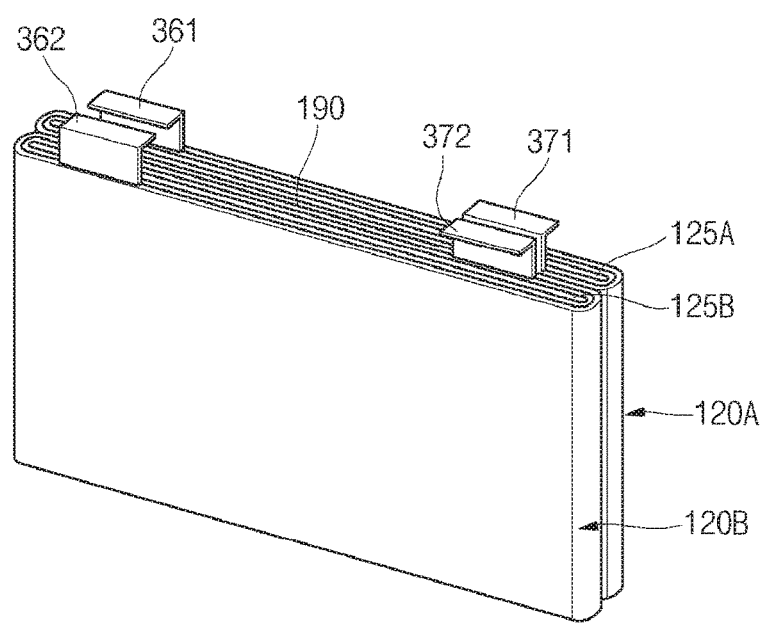

Referring to FIGS. 4A and 4B, a plan view and a perspective view of first and second electrode assemblies in a secondary battery having symmetrical multi-tabs according to another embodiment of the present invention are illustrated.

As shown in FIGS. 4A and 4B, the first and second electrode assemblies 120A and 120B may include first and second multi-tabs (or outer multi-tabs) 361 and 362 located at their outer regions and first and second multi-tabs (or inner multi-tabs) 371 and 372 located at their inner regions.

For example, in FIGS. 4A and 4B, the first and second multi-tabs 361 and 362 located roughly in the left sides of the first and second electrode assemblies 120A and 120B may be symmetrical with outer regions (i.e., regions each adjacent to a first long side portion or a second long side portion) of the first and second electrode assemblies 120A and 120B, and the first and second multi-tabs 371 and 372 located roughly in the right sides of the first and second electrode assemblies 120A and 120B may be symmetrical with inner regions (i.e., regions each adjacent to the boundary area) of the first and second electrode assemblies 120A and 120B. Here, the left-side first and second multi-tabs 361 and 362 may be positive electrode tabs, and the right-side first and second multi-tabs 371 and 372 may be negative electrode tabs.

In more detail, in the first electrode assembly 120A, the left-side first multi-tab 361 (positive electrode) may be located at the outer region of the first electrode assembly 120A, and the right-side first multi-tab 371 (negative electrode) may be located at the inner region of the first electrode assembly 120A. In the second electrode assembly 120B, the left-side first multi-tab 362 (positive electrode) may be located at the outer region of the second electrode assembly 120B, and the right-side first multi-tab 372 (negative electrode) may be located at the inner region of the second electrode assembly 120B.

Still in other words, the first and second multi-tabs 361 and 362 of the first and second electrode assemblies 120A and 120B may be symmetrical with each other, and the left-side first multi-tab 361 (positive electrode) and the right-side first multi-tab 371 (negative electrode) of the first electrode assembly 120A are extended and bent to be symmetrical with each other to then be coupled to the first and second electrode terminals 140 and 150, respectively. In addition, the first and second multi-tabs 371 and 372 of the first and second electrode assemblies 120A and 120B may be symmetrical with each other, and the left-side second multi-tab 362 (positive electrode) and the right-side second multi-tab 372 (negative electrode) of the second electrode assembly 120B are extended and bent to be symmetrical with each other to then be coupled to the first and second electrode terminals 140 and 150, respectively.

Therefore, the first electrode assembly 120A is coupled to the first and second electrode terminals 140 and 150, respectively, in a state in which the positive electrode first multi-tab 361 and the negative electrode first multi-tab 371 are symmetrical with each other (?), and the second electrode assembly 120B is coupled to the first and second electrode terminals 140 and 150, respectively, in a state in which the positive electrode second multi-tab 362 and the negative electrode second multi-tab 372 are symmetrical with each other (?), thereby improving coupling strength, coupling stiffness and coupling reliability between the first and second electrode assemblies 120A and 120B and the first and second electrode terminals 140 and 150.

Figure 5C:
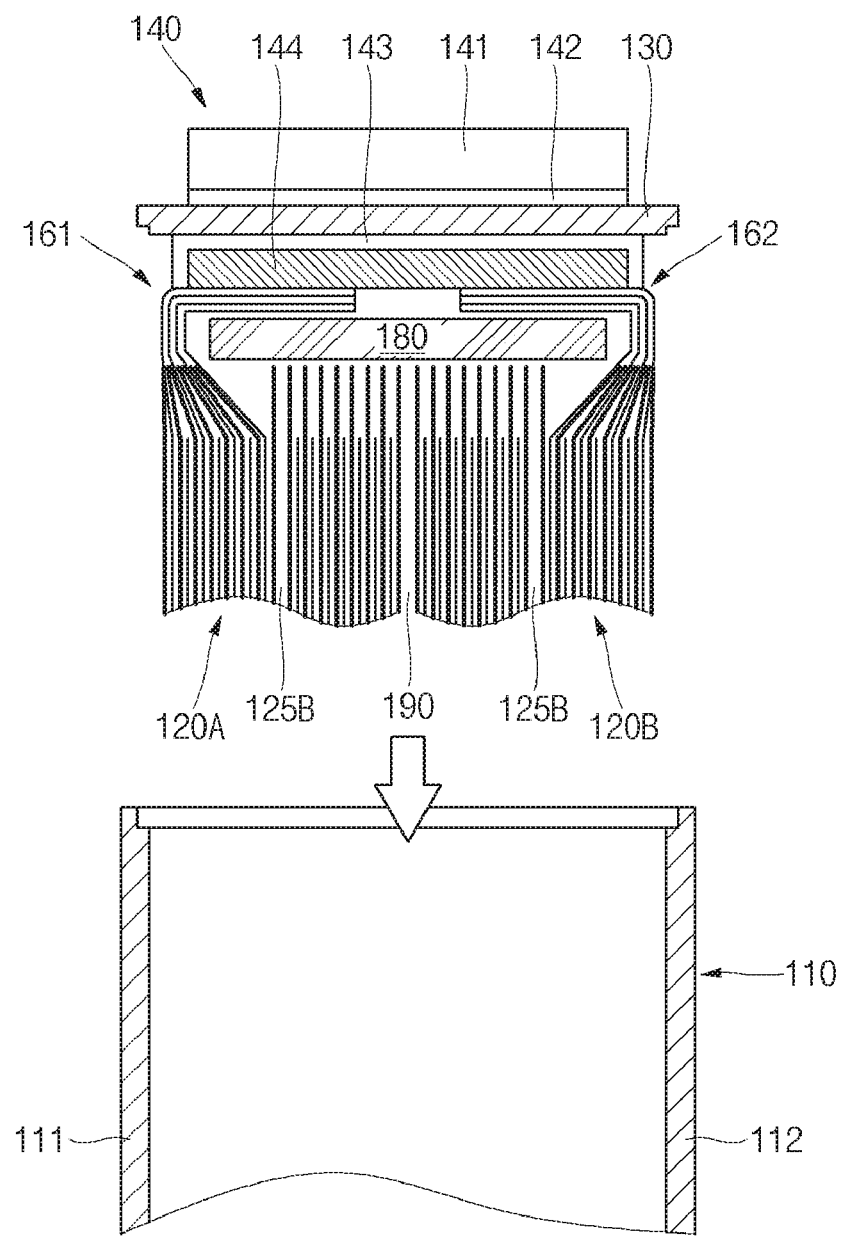

Referring to FIGS. 5A to 5C, schematic views illustrating a manufacturing method of a secondary battery 100 having symmetrical multi-tabs according to an embodiment of the present invention are illustrated.

As shown in FIG. 5A, the first electrode first multi-tab 161 and the second electrode first multi-tab 171 of the first electrode assembly 120A are welded to the first electrode terminal 140, that is, the first current collector plate 144, and the second electrode terminal 150, that is, the second current collector plate 154, provided in the cap plate 130, and the first electrode second multi-tab 162 and the second electrode second multi-tab 172 of the second electrode assembly 120B are also welded to the first electrode terminal 140 and the second electrode terminal 150, respectively. Here, the first electrode first multi-tab 161 and the second electrode first multi-tab 171 of the first electrode assembly 120A, and the first electrode second multi-tab 162 and the second electrode second multi-tab 172 of the second electrode assembly 120B, have yet to be bent. In addition, if the welding process is completed, the insulation plate 180 is placed on the cap plate 130. That is to say, the insulation plate 180 is placed on the first electrode first multi-tab 161 and the first electrode second multi-tab 162, which are positioned on the first current collector plate 144, and the second electrode first multi-tab 171 and second electrode second multi-tab 172, which are positioned on the second current collector plate 154.

As shown in FIG. 5B, the first and second electrode assemblies 120A and 120B are bent roughly at right angle from the cap plate 130. Accordingly, the first and second multi-tabs 161 and 162 provided in the first and second electrode assemblies 120A and 120B are bent with the first regions 161a and 162a, the second regions 161b and 162b and the third regions 161c and 162c. In addition, as the result of the bending process, the insulation plate 180 may be substantially covered by the first and second electrode assemblies 120A and 120B, the first and second multi-tabs 161 and 162 and the cap plate 130. In addition, as the result of the bending process, the first and second electrode assemblies 120A and 120B are brought into close contact with each other to be parallel with each other.

As shown in FIG. 5C, the first and second electrode assemblies 120A and 120B being in close contact with each other are inserted into the case 110. That is to say, until the cap plate 130 closes the case 110, the first and second electrode assemblies 120A and 120B and the cap plate 130 are pushed into the case 110.

Next, the cap plate 130 is welded to the case 110 to then be fixed, and an electrolytic solution is inserted into the case 110 through an electrolyte injection hole. However, this process may be omitted in a case of a solid battery requiring no electrolytic solution.

As described above, according to various embodiments of the present invention, since the first and second multi-tabs 161 and 162 are located only at outer regions (or inner regions) of the first and second electrode assemblies 120A and 120B, as the result of the bending process, the first and second multi-tabs 161 and 162 are bent so as to be symmetrical with each other. Therefore, it is possible to prevent electrical short circuits between the first and second multi-tabs 161 and 162, and the case, the cap plate and/or the first and second electrode assemblies, which have polarities opposite to the first and second multi-tabs 161 and 162 from occurring during or after the manufacture of the secondary battery 100.

Figure 6:
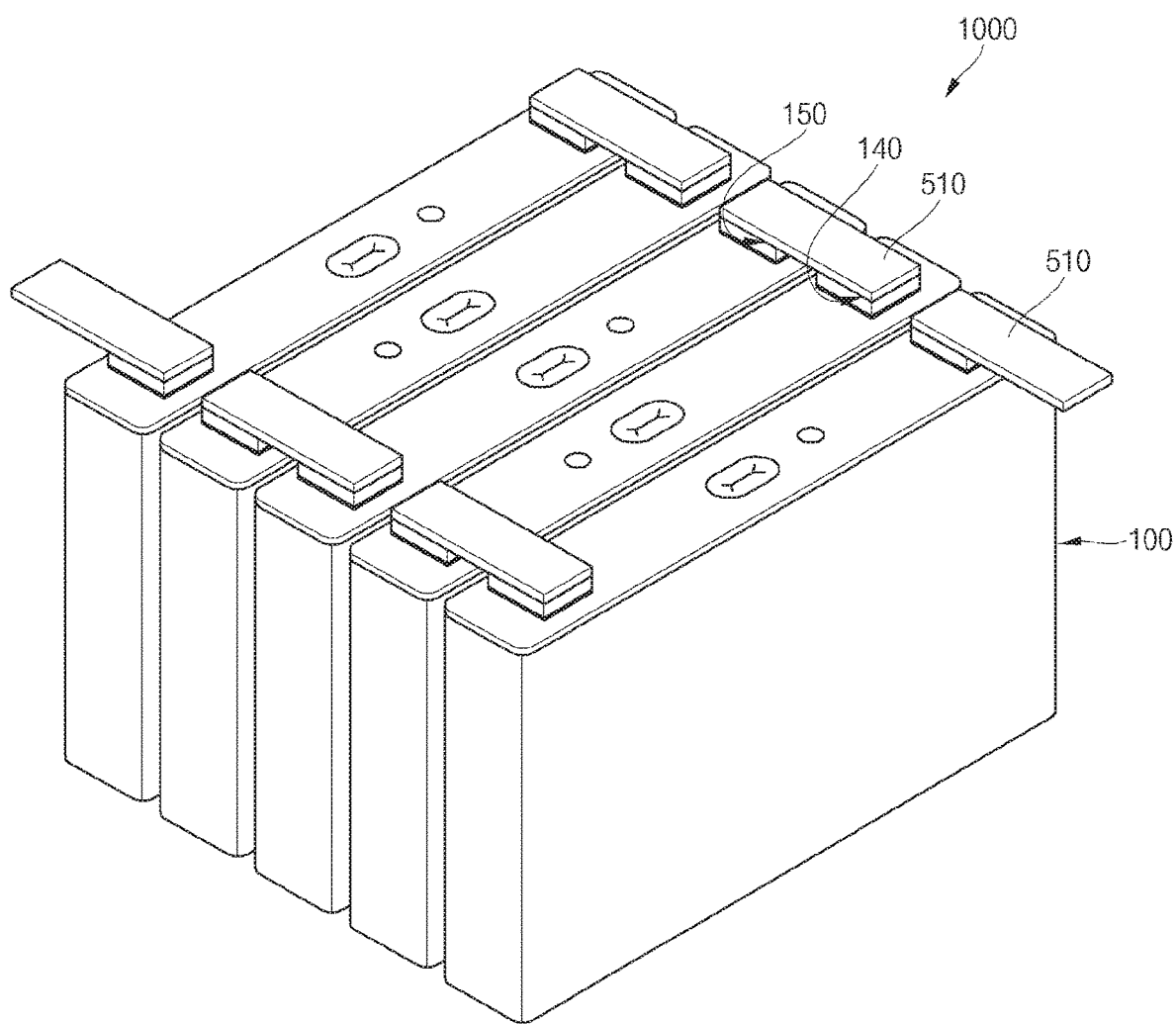
FIG. 6 is a perspective view illustrating an example of a battery module using a secondary battery having symmetrical multi-tabs according to an embodiment of the present invention.

Referring to FIG. 6, a perspective view illustrating an example of a battery module using a secondary battery 100 having symmetrical multi-tabs according to an embodiment of the present invention is illustrated.

As shown in FIG. 6, multiple secondary batteries 100 are arranged in a line and multiple bus bars 510 are coupled to the multiple secondary batteries 100, thereby completing the battery module 1000. For example, a first electrode terminal 140 of one of the multiple secondary batteries 100 and a second electrode terminal 150 of another adjacent secondary battery 100 may be welded to each other using the bus bar 510, thereby providing the battery module 1000 including the multiple secondary batteries 100 connected to one another in series. The bus bar 510 may be made of aluminum or an aluminum alloy, and a first terminal plate 131 of the first electrode terminal 140 and a second terminal plate 141 of the second electrode terminal 150 may also be made of aluminum or an aluminum alloy, thereby allowing the bus bar 510 to be easily welded to the first electrode terminal 140 and the second electrode terminal 150.

Although the foregoing embodiments have been described to practice the secondary battery having symmetric multi-tabs of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A secondary battery comprising:
a case;
a first electrode assembly accommodated inside the case and having first multi-tabs;
a second electrode assembly accommodated in parallel with, and independent of, the first electrode assembly inside the case and having second multi-tabs; and
a cap plate closing the case and having first and second electrode terminals that are respectively electrically connected via welding to the first and second multi-tabs of the first and second electrode assemblies,
wherein the first and second multi-tabs, and the first and second electrode assemblies, are formed so as to be respectively substantially symmetrical with respect to a boundary area between the first and second electrode assemblies.

2. The secondary battery of claim 1, wherein the first and second multi-tabs are closer to the case than to the boundary area.

3. The secondary battery of claim 1, wherein the first and second multi-tabs are extended to the electrode terminals from regions closer to the case than to the boundary area.

4. The secondary battery of claim 1, wherein the first electrode assembly includes a first winding center,
wherein the second electrode assembly includes a second winding center,
wherein the case includes a first long side portion closely contacting the first electrode assembly and a second long side portion closely contacting the second electrode assembly,
wherein at least one of the first multi-tabs is located between the first winding center and the first long side portion, and
wherein at least one of the second multi-tabs is located between the second winding center and the second long side portion.

5. The secondary battery of claim 1, wherein the first and second multi-tabs are located only at regions closer to the boundary area than to the case, respectively.

6. The secondary battery of claim 1, wherein the first and second multi-tabs are extended to the electrode terminals from regions closer to the boundary area than to the case, respectively.

7. The secondary battery of claim 3, wherein the first and second multi-tabs include first regions extended from the first and second electrode assemblies, second regions extended from the first regions so as to be adjacent to the case, and third regions bent from the second regions to be connected to the electrode terminals, respectively.

8. The secondary battery of claim 1, wherein the first electrode assembly includes a first winding center,
wherein the second electrode assembly includes a second winding center,
wherein at least one of the first multi-tabs is located between the first winding center and the boundary area, and
wherein at least one of the second multi-tabs is located between the second winding center and the boundary area.

9. The secondary battery of claim 1, wherein the first and second electrode assemblies further comprise insulation plates covered by the first and second multi-tabs and the electrode terminals, respectively.

10. The secondary battery of claim 1, wherein the first and second multi-tabs include outer multi-tabs located at regions closer to the case than to the boundary area, and inner multi-tabs located at regions closer to boundary area than to the case.

* * * * *